United States Patent [19]

Kudo

[11] Patent Number: 4,554,140

[45] Date of Patent: Nov. 19, 1985

[54] OFF-GAS DESULFURIZATION PROCESS

[75] Inventor: Yoshihiko Kudo, Iwaki, Japan

[73] Assignee: Kureha Chemical Industry Co., Ltd., Japan

[21] Appl. No.: 644,977

[22] Filed: Aug. 28, 1984

[30] Foreign Application Priority Data

Oct. 25, 1983 [JP] Japan .............................. 58-199440

[51] Int. Cl.[4] ............................................ C01B 17/00
[52] U.S. Cl. .................................... 423/243; 423/166
[58] Field of Search .............. 423/243, 242 A, 242 R, 423/166

[56] References Cited

U.S. PATENT DOCUMENTS 3,928,537 12/1975 Saitoh et al. ........................ 423/243
4,092,402 5/1978 Kobayashi et al. ................. 423/243
4,155,988 5/1979 Karwat et al. ...................... 423/243

*Primary Examiner*—Gregory A. Heller
*Attorney, Agent, or Firm*—McGlew and Tuttle

[57] ABSTRACT

In the conversion of sulfur dioxide in an off-gas to gypsum for removal by oxidizing with an oxygen-containing gas while neutralizing with limestone an absorbed solution formed by contacting an off-gas containing sulfur dioxide with an absorbing solution containing an organic carboxylate, the addition of a thiocyanate to the absorbing solution makes it possible to inhibit the decomposition of the organic carboxylic acid in the absorbing solution.

4 Claims, No Drawings

OFF-GAS DESULFURIZATION PROCESS

BACKGROUND OF THE INVENTION

This invention relates to an improvement in the off-gas desulfurization process which comprises fixing sulfur dioxide contained in the off-gas in the form of gypsum for removal therefrom by using an absorbing solution containing an organic carboxylate.

Attention has recently been focused, because of its advantages in desulfurization efficiency and economy, on a wet off-gas desulfurization process which comprises contacting sulfur dioxide contained in an off-gas with an absorbing solution containing an organic carboxylic acid and a salt thereof, and oxidizing the resulting absorbed solution while neutralizing the solution with limestone in order to fix the sulfur dioxide in the form of gypsum for separation.

In this process, the combination of an absorption reaction of sulfur dioxide with an absorbing solution containing an organic carboxylate and a neutralization reaction of the absorbed solution with limestone improves the desulfurization effect and remarkably promotes the gypsum-forming reaction, resulting in a reduction in both plant cost and power consumption.

The advantages mentioned above come about because, in this process, an absorbing solution containing an organic carboxylate is used to form a mixed system of carboxylate ion ($RCOO^-$) and carboxylic acid ($RCOOH$) so as to cause the solution to have a good pH buffer capacity in a pH range of from 3 to 6, and because the carboxylate ion and the carboxylic acid may be present in a dissolved state in the absorbing solution containing a calcium compound such as limestone, gypsum, or the like.

This wet off-gas desulfurization process for removing sulfur dioxide in an off-gas by converting the sulfur dioxide to gypsum, usually called the gypsum by-producing process, essentially consists of an absorption reaction of sulfur dioxide with an absorbing solution, an oxidation reaction of the absorbed solution with an oxygen-containing gas such as air, and a neutralization reaction of the absorbed solution with limestone. Each reaction causes a pH change in the absorbing solution and, among the reactions, the higher the pH, the more effectively the absorption reaction of sulfur dioxide takes place, while a lower pH is preferable for the neutralization reaction with limestone. Therefore, in order to conduct each reaction as effectively as possible, it is necessary that the pH of the absorbing solution be maintained in a weak acidic range of from 3 to 6 and it is preferable that the pH change during each reaction be small.

In the off-gas desulfurization process described above, the use of a liquid containing an organic carboxylate as the absorbing solution causes each reaction to take place effectively, because the organic carboxylate has a good pH buffer capacity in a pH range of from 3 to 6.

However, a serious problem which results from the use of an absorbing solution containing an organic carboxylate is that the organic carboxylate is decomposed to be consumed during the oxidation reaction.

In other words, when $SO_3^{2-}$ and $HSO_3^-$ formed by the absorption of sulfur dioxide in the absorbing solution containing the organic carboxylate are oxidized with oxygen in the oxidation step for the absorbed solution, an active radical is formed as an intermediate reaction product, and the radical is responsible for the induced oxidative decomposition of the organic carboxylic acid coexisting therein.

The present inventor previously proposed, as a process for inhibiting the decomposition of organic carboxylic acid described above, a process in which a solution coexisted with a chloride ion in an amount of more than 2 percent by weight to a solution containing an organic carboxylate is used as an absorbing solution (see U.S. Pat. No. 4367205). The above process is based on the discovery that the decomposition of organic carboxylate is inhibited by the presence of a chloride ion, and that the higher the concentration of the chloride ion, the higher the inhibiting effect thereof.

However, although the above process is recommended for the desulfurization of an off-gas containing a large amount of hydrogen chloride such as coal combustion off-gas or in the event that the industrial water used contains a chloride ion at a high level, the above process is not recommended for the desulfurization of an off-gas containing chlorine compounds in small amounts such as a petroleum combustion off-gas, or in the event that industrial water containing a chloride ion at a low level is used because it is necessary to add a chlorine compound to the absorbing solution and provide an apparatus made of a corrosion resistant material in order to inhibit corrosion due to the effect of the chloride ion on the apparatus.

Moreover, further studies showed that, based on the above process, the dissolution rate of limestone during the neutralization step is reduced as the chloride ion concentration in the absorbing solution is increased, resulting in the need to increase the size of the neutralization tank in order to promote the neutralization reaction.

SUMMARY OF THE INVENTION

The present invention has been effected to overcome the defects in the wet off-gas desulfurization process comprising the gypsum by-producing process as described above.

A major object of the present invention is to provide a process which is capable of effectively inhibiting the decomposition of an organic carboxylic acid which takes place in the off-gas desulfurization process described above using an absorbing solution containing an organic carboxylate, even in the event that the chloride content in the absorbing solution is at a low level. Other objects of the present invention will become apparent from the description which follows.

The present invention is characterized in that in an off-gas desulfurization process which comprises contacting an off-gas containing sulfur dioxide with an absorbing solution containing an organic carboxylate, and oxidizing the resulting absorbed solution with an oxygen-containing gas while neutralizing the absorbed solution with limestone to convert the sulfur dioxide in the off-gas into gypsum for removal, a thiocyanate is added to said absorbing solution containing the organic carboxylate.

DETAILED DESCRIPTION OF THE INVENTION

The present inventor discovered that, in view of the technical background in the prior art, in the off-gas desulfurization process described above in which an absorbing solution having a low concentration of chloride ion (containing Cl⁻ in an amount of less than 2 percent by weight) is used, a halogen ion such as a bromide ion or an iodide ion other than a chloride ion is also effective in inhibiting the decomposition of the organic carboxylic acid in the absorbing solution, and further discovered that a thiocyanate as a halogenoid compound exhibits an excellent inhibiting effect on the decomposition of the carboxylic acid.

In other words, the present invention has been effected based on the discovery that in the off-gas desulfurization process, comprising the gypsum by-producing process, in which a solution containing an organic carboxylate is used as an absorbing solution, the presence of $SCN^-$ in the absorbing solution makes it possible to effectively inhibit the decomposition of the organic carboxylic acid due to the induced oxidation described above.

Japanese Patent Laid-open No. 119487/1977 discloses a process for removing nitrogen oxides in off-gases in which process a thiocyanate is added to an aqueous solution containing a ferrous ion chelate complex and is used to absorb the nitrogen oxides as an inhibitor for the decomposition of the chelate. However, since the decomposition or degradation of the ferrous ion chelate comples and the ferric ion chelate complex takes place slowly due to the oxygen and sulfur dioxide contained in the off-gas, or by heating of the absorbing solution or the like, as described in the above patent laid-open specification, the decomposition or degradation therein is essentially different in mechanism from the decomposition due to the induced oxidation of the organic carboxylic acid, which takes place as a result of oxidation of $SO_3^{2-}$ and $HSO_3^-$ contained in the absorbed solution formed by absorbing sulfur dioxide in the absorbing solution containing the organic carboxylate according to the present invention.

The amount of the thiocyanate added to the absorbing solution containing the organic carboxylate according to the present invention is preferably adjusted to a concentration of from 50 to 1000 mg/kg as $SCN^-$. The concentration range thereof is determined in consideration of the fact that the $SCN^-$ itself added to the absorbing solution is subjected to an induced oxidation to be decomposed to a certain extent, and that a certain amount of the thiocyanate is discharged out of the off-gas desulfurization system to be lost, being entrained with the gypsum produced in the system. The above concentration range of the thiocyanate is recommended, since it causes no problems with the various reactions in the absorption of sulfur dioxide and in the oxidation of the sulfur dioxide contained in the absorbed solution, nor with the dissolution of the limestone (calcium carbonate) in the neutralization reaction. Examples of the thiocyanate to be used in the present invention include ammonium thiocyanate, potassium thiocyanate, sodium thiocyanate and the like. Examples of the organic carboxylate used in the present invention include salts of such acids as succinic acid, glutaric acid, adipic acid, sulfoacetic acid, β-sulfopropionic acid and sulfosuccinic acid.

In the industrial practice of the present invention, an absorbing solution containing a minimum amount of both sulfite and unreacted calcium carbonate is used as the absorbing solution of sulfur dioxide.

The organic carboxylate is preferably contained at a concentration of from 0.04 to 0.4 mol/kg as $RCOO^-$ plus $RCOOH$ in the absorbing solution, the sulfate is preferably contained therein at a concentration of from 2 to 5 percent by weight, the crystalline gypsum is preferably contained therein at a concentration of from 5 to 10 percent by weight, and the pH therein is preferably in the range of from 4.8 to 5.5. Further, since the presence of sulfite in the absorbing solution increases a $SO_2$ partial pressure of the absorbing solution to reduce the desulfurization effect, the amount of sulfite therein is preferably reduced to less than 2 m-mol/kg.

The use of the absorbing solution having the above composition makes it possible to carry out effectively the various reactions such as absorption of the sulfur dioxide, oxidation of the absorbed solution, and neutralization with limestone.

As described above, the use of a solution prepared by adding a thiocyanate in an effective amount to a solution containing an organic carboxylate as an absorbing solution makes it possible to effectively inhibit the decomposition of the organic carboxylic acid even in the event that the chloride ion concentration in the absorbing solution is at a low level. Therefore, the process of the present invention is recommendable as for the industrial practice.

The effect of the present invention will be explained more in detail by the Example below. However, the scope of the present invention is not limited to the Example.

EXAMPLE

This example shows the results obtained by effecting the oxidation reaction of the absorbed solution experimentally in order to demonstrate the inhibiting effect of the decomposition of the organic carboxylic acid by the addition of the thiocyanate to the absorbing solution containing the organic carboxylate.

To a 1.2 l cylindrical air-blowing stirred tank as a laboratory device were charged 800 g of each of the solutions having each of the compositions as shown in the Table below and 300 g of $CaSO_3 \cdot \frac{1}{2}H_2O$, and air was blown thereinto to completely oxidize the slurry-like $CaSO_3 \cdot \frac{1}{2}H_2O$ to $CaSO_4 \cdot 2H_2O$. During the oxidation reaction, the temperature of the slurry, was maintained at 55° C., the pH was kept at 5.0±0.1, the amount of air blown was kept constant at 20 Nl/hr, and stirring was effected at 1000 r.p.m. The oxidation rate of $HSO_3^-$ plus $SO_3^{2-}$ under these air-blowing stirring conditions was approximately 0.2 mol/kg·hr.

Further, since the pH of the solution increased slightly during the oxidation reaction with the decomposition of the organic carboxylic acid in the slurry, the pH of the solution was adjusted to be kept in the range described above by dropping 5 N $H_2SO_4$ solution occasionally.

After the oxidation reaction described above was completed, the amounts of the acids decomposed during the reaction were calculated by measuring the concentrations of carboxylic acid and thiocyanic acid in each of the reaction liquids. The results obtained are shown in the following Table:

TABLE

| | Experiment No. | | | | | | |
|---|---|---|---|---|---|---|---|
| | 1 | 2 | 3 | 11 | 12 | 13 | 14 |
| Composition of the solution | | | | | | | |
| Sodium sulfosuccinate (48.8 m-mol/kg) (% by weight as trisodium salt) | 1.29 | 1.29 | 1.29 | 1.29 | 1.29 | 1.29 | 1.29 |
| $MgSO_4$ (% by weight) | 1.0 | 1.0 | 1.0 | 1.0 | 1.0 | 1.0 | 1.0 |
| $MgCl_2$ (% by weight as $Cl^-$) | 0.1 | 0.1 | 0.1 | 0.47 | 0.47 | 0.47 | 0.47 |
| $FeSO_4$ (mg/kg as $Fe^{2+}$) | 50 | 50 | 50 | 50 | 50 | 50 | 50 |
| $NH_4SCN$ (mg/kg as $SCN^-$) | 0 | 100 | 500 | 0 | 100 | 500 | 1000 |
| Amount of sulfosuccinic acid decomposed (m-mol) | 18.3 | 14.8 | 1.0 | 10.7 | 9.1 | 4.6 | 3.2 |
| Amount of thiocyanic acid decomposed (m-mol) | — | 0.20 | 1.58 | — | 0.19 | 0.85 | 3.6 |

As shown in the Table, the decomposition of the organic carboxylic acid in the absorbing solution was greatly reduced by the addition of the thiocyanate ($SCN^-$) to the absorbing solution. Although the thiocyanate itself was decomposed to some extent, the amount thereof decomposed was shown to be small.

I claim:

1. In an off-gas desulfurization process which comprises contacting an off-gas containing sulfur dioxide with an absorbing solution containing an organic carboxylate, and oxidizing the resulting absorbed solution with an oxygen-containing gas while neutralizing the absorbed solution with limestone to convert the sulfur dioxide in the off-gas into gypsum for removal, the improvement which comprises adding a thiocyanate at a concentration of from 50 to 1000 mg/kg as $SCN^-$ to said absorbing solution containing the organic carboxylate.

2. An off-gas desulfurization process according to claim 1, wherein a solution containing sulfate, chloride and crystalline gypsum along with the organic carboxylate and the thiocyanate is used as said absorbing solution.

3. An off-gas desulfurization process according to claim 1, wherein said organic carboxylate is a salt of at least one carboxylic acid selected from the group consisting of succinic acid, glutaric acid, adipic acid, sulfoacetic acid, β-sulfopropionic acid and sulfosuccinic acid.

4. An off-gas desulfurization process according to claim 2, wherein said organic carboxylate is a salt of at least one carboxylic acid selected from the group consisting of succinic acid, glutaric acid, adipic acid, sulfoacetic acid, β-sulfopropionic acid and sulfosuccinic acid.

* * * * *